United States Patent
Li

(10) Patent No.: US 6,618,984 B1
(45) Date of Patent: Sep. 16, 2003

(54) MOSQUITO ATTRACTION AND KILLING SYSTEM WITH OPERATION SOLELY BASED ON UTILIZATION OF SUNLIGHT AND WATER

(76) Inventor: Guining Li, 1445 Starr Grass Dr., Madison, WI (US) 53719

( * ) Notice: Subject to any disclaimer, the term of this patent is extended or adjusted under 35 U.S.C. 154(b) by 0 days.

(21) Appl. No.: 10/286,998

(22) Filed: Nov. 4, 2002

(51) Int. Cl.$^7$ ............................. A01M 1/22; A01M 1/02
(52) U.S. Cl. ........................................... 43/112; 43/107
(58) Field of Search .................... 43/112, 107, 132.1

(56) References Cited

U.S. PATENT DOCUMENTS

| | | | | | |
|---|---|---|---|---|---|
| 625,677 | A | * | 5/1899 | Heymann | 43/107 |
| 1,065,782 | A | * | 6/1913 | Cronk | 43/112 |
| 1,108,309 | A | * | 8/1914 | Allen et al. | 43/112 |
| 1,549,161 | A | * | 8/1925 | Sutton | 43/112 |
| 1,823,892 | A | * | 9/1931 | Galbraith | 43/112 |
| 1,996,293 | A | * | 4/1935 | House | 43/107 |
| 2,012,384 | A | * | 8/1935 | Gatti | 43/112 |
| 2,038,495 | A | * | 4/1936 | Keller | 43/112 |
| 3,708,907 | A | * | 1/1973 | Cole | 43/112 |
| 3,986,292 | A | * | 10/1976 | Klebanoff | 43/112 |
| 3,997,999 | A | * | 12/1976 | Evans | 43/107 |
| 4,037,351 | A | * | 7/1977 | Springer | 43/112 |
| 4,179,839 | A | * | 12/1979 | Salotti et al. | 43/112 |
| 4,182,069 | A | * | 1/1980 | De Yoreo | 43/112 |
| 4,328,636 | A | * | 5/1982 | Johnson | 43/107 |
| 4,387,529 | A | * | 6/1983 | Hedstrom | 43/112 |
| 4,506,473 | A | * | 3/1985 | Waters, Jr. | 43/107 |
| 4,523,404 | A | * | 6/1985 | DeYoreo | 43/112 |
| 4,603,505 | A | * | 8/1986 | Millard | 43/112 |
| 4,907,366 | A | * | 3/1990 | Balfour | 43/132.1 |
| 4,908,978 | A | * | 3/1990 | Zacharias | 43/112 |
| 4,914,854 | A | * | 4/1990 | Zhou et al. | 43/112 |
| 4,962,611 | A | * | 10/1990 | Millard | 43/112 |
| 5,123,201 | A | * | 6/1992 | Reiter | 43/107 |
| 5,205,064 | A | * | 4/1993 | Nolen | 43/112 |
| 5,241,779 | A | * | 9/1993 | Lee | 43/112 |
| 5,595,018 | A | * | 1/1997 | Wilbanks | 43/112 |
| 5,632,115 | A | * | 5/1997 | Heitman | 43/112 |
| 5,657,576 | A | * | 8/1997 | Nicosia | 43/112 |
| 5,799,436 | A | * | 9/1998 | Nolen et al. | 43/112 |
| 5,896,697 | A | * | 4/1999 | Kang | 43/107 |
| 5,899,018 | A | * | 5/1999 | Gordon et al. | 43/132.1 |

(List continued on next page.)

FOREIGN PATENT DOCUMENTS

| | | | | | |
|---|---|---|---|---|---|
| DE | 2749419 | B1 | * | 3/1979 | 43/112 |
| EP | 547828 | B1 | * | 6/1993 | |
| FR | 454726 | B1 | * | 7/1913 | 43/112 |
| FR | 987868 | B1 | * | 8/1951 | 43/112 |
| GB | 2316288 | B1 | * | 2/1998 | |
| JP | 6-153753 | B1 | * | 6/1994 | |
| JP | 11-46659 | B1 | * | 2/1999 | |
| JP | 2000-139318 | B1 | * | 5/2000 | |
| JP | 2000-154589 | B1 | * | 6/2000 | |
| JP | 2000-189030 | B1 | * | 7/2000 | |
| JP | 2002-125563 | B1 | * | 5/2002 | |
| WO | WO-02/098218 | B1 | * | 12/2002 | |

*Primary Examiner*—Darren W. Ark

(57) ABSTRACT

A sunlight and water utilized compound mosquito attraction apparatus and an energy efficient sunlight powered mosquito killing system, which can be integrated into a complete mosquito attraction and killing system, solely use natural resources of sunlight and water to perform functions of mosquito attraction and killing. Comprising a multi-function solar utilizer and a standing water container, the sunlight and water utilized compound mosquito attraction apparatus synthetically and complementarily utilizes sunlight and water. To use sunlight to kill mosquito with less size and less cost of group of solar cells and with functional time beyond daytime, the energy efficient sunlight powered mosquito killing system uses two energy reservoirs and a periodic control process of letting the system alternatively in electricity supply state and electricity non-supply state. The specific physical form of the integrated mosquito attraction and killing system also allows zero maintenance effort.

7 Claims, 6 Drawing Sheets

U.S. PATENT DOCUMENTS

| | | | |
|---|---|---|---|
| 5,967,084 A * | 10/1999 | Klemantaski | 43/112 |
| 6,023,884 A * | 2/2000 | Yanohara | 43/132.1 |
| 6,050,025 A * | 4/2000 | Wilbanks | 43/112 |
| 6,055,766 A * | 5/2000 | Nolen et al. | 43/112 |
| 6,209,256 B1 * | 4/2001 | Brittin et al. | 43/107 |
| 6,305,122 B1 * | 10/2001 | Iwao et al. | 43/112 |
| 6,516,559 B1 * | 2/2003 | Simchoni et al. | 43/107 |
| 6,530,172 B2 * | 3/2003 | Lenz | 43/112 |
| 6,530,173 B2 * | 3/2003 | Meade et al. | 43/112 |
| 6,543,180 B2 * | 4/2003 | Pace | 43/107 |
| 6,568,124 B1 * | 5/2003 | Wilbanks | 43/112 |
| 2002/0121045 A1 * | 9/2002 | Hall | 43/107 |
| 2003/0061757 A1 * | 4/2003 | Askin | 43/112 |
| 2003/0070345 A1 * | 4/2003 | Nolen et al. | 43/112 |
| 2003/0070346 A1 * | 4/2003 | Winner et al. | 43/112 |

* cited by examiner

MOSQUITO ATTRACTION AND KILLING SYSTEM WITH OPERATION SOLELY BASED ON UTILIZATION OF SUNLIGHT AND WATER

BACKGROUND OF THE INVENTION

The present invention is in the field of utilization of natural resources of sunlight and water to attract and kill mosquito.

In the whole contents of presented specifications and claims, the term of "a group of solar cells" means a number of solar cells which is from one to any greater number, and the term of "a group of rechargeable batteries" means a number of rechargeable batteries which is from one to any greater number.

Previous invented devices and current market available products of mosquito control use variety of approaches to attract mosquitoes. Carbon dioxide, octenol, and infrared are common mosquito attraction sources in these previous patented devices and current products in market. Using high voltage electric grid to kill mosquito is a kind of common practice in these patented devices and current products. However, processes of usage of these invented devices and current products present certain disadvantages in the aspects of convenience, cost, safety, and environment. When these invented devices and current products are to be used, to obtain the required carbon dioxide, a substance such as. propane has to be purchased in a specific place and has to be burned in use; to obtain the octenol, a can of compressed octenol has to be purchased in a specific place; and to obtain the infrared, an electrical heating device and associated outdoor electrical cord and outdoor electrical outlet have to be used. Although using solar cell to power electric grid of mosquito killing are mentioned in previous patents, how to use solar cell effectively and efficiently and how to use solar cell to power the electric grid beyond the limit of daytime in a mosquito killing system still keep challenging.

Sunlight and water are the most conveniently and economically obtainable environment friendly natural resources for most people in residential areas. Solely using natural resources of sunlight and water in an apparatus to attract and kill mosquitoes in a convenient and economical way should result in a mosquito control device that would provide more advantages in the aspects of convenience, cost, safety, and environment than the previous invented devices and current products in market do. Solely utilizing natural resources of sunlight and water to perform functions of mosquito attraction and killing in ingenious ways is the pursuit of this presented invention.

BRIEF SUMMARY OF THE INVENTION

Sunlight and water are the most conveniently and economically obtainable natural resources for common people. Sunlight and water are the most environment friendly natural resources to be used by common people. Building mosquito attraction and killing apparatus solely based on natural resources of sunlight and water to perform functions of mosquito attraction and mosquito killing is the fundamental goal of the present invention. The followings are the specific goals of mosquito attraction apparatus and mosquito killing system. For mosquito attraction apparatus, sunlight and water are to be synthetically and complementarily utilized; the physical form of the apparatus is to be simple to be manufactured; and the physical form of the apparatus is to be ingenious to be used conveniently. For mosquito killing system, the system is to continuously perform mosquito killing function with the energy of sunlight; the system is to perform mosquito killing function during both daytime and nighttime or other sunlight insufficient conditions with the energy of sunlight; and the mosquito killing system is to be integrated with the mosquito attraction apparatus to form a complete mosquito attraction and killing system that is solely based on natural resources of sunlight and water to perform functions of mosquito attraction and mosquito killing and is conveniently used and manufactured.

The present invention includes two parts of a complete mosquito attraction and killing system. The first part is sunlight and water utilized compound mosquito attraction apparatus. The second part is energy efficient sunlight powered mosquito killing system. The combination of the first part and the second part of the invention forms a complete mosquito attraction and killing system that solely utilizes natural resources of sunlight and water to perform its functions of mosquito attraction and mosquito killing.

The sunlight and water utilized compound mosquito attraction apparatus comprises two major parts. For the convenience of description, the first major part of the sunlight and water utilized compound mosquito attraction apparatus is called multi-function solar utilizer and the second major part of the sunlight and water utilized compound mosquito attraction apparatus is called standing water container.

The multi-function solar utilizer has three basic characteristics in structure and material. The first characteristic is that the lower part of the multi-function solar utilizer is capable of containing liquid, such as water. The second characteristic is that on the upper part of the multi-function solar utilizer, there are a number of small holes which are channels to release both inner gaseous molecules and inner infrared radiation to the outside of the multi-function solar utilizer. The third characteristic is that the outer surface of the multi-function solar utilizer is of dark color, such as black.

The standing water container has one basic characteristic in structure and material. The characteristic is that the wall of the standing water container is transparent so that upper surface of contained water can be seen from outside. The transparent wall of the standing water container does not allow mosquitoes to directly contact with the contained water.

The multi-function solar utilizer and the standing water container are connected together to form the sunlight and water utilized compound mosquito attraction apparatus. The preferred, but not limited, physical form of the sunlight and water utilized compound mosquito attraction apparatus combined by the above two major parts is a column with the multi-function solar utilizer as the upper part and the standing water container as the lower part.

The mosquito attraction apparatus performs the following six functions of mosquito attraction.

1. The multi-function solar utilizer transforms sunlight into infrared radiation, which is released through the small holes, with temperature characteristic of human beings and birds to attract mosquitoes.

2. The multi-function solar utilizer transforms sunlight into infrared radiation, which is released through the small holes, with spectrum characteristic of water to attract mosquitoes.

3. The multi-function solar utilizer utilizes sunlight to produce gaseous state water, which is released through the small holes, to attract mosquitoes.

4. The multi-function solar utilizer utilizes sunlight to create a warm object in the seasons of early spring and late fall to attract mosquitoes.

5. The multi-function solar utilizer utilizes sunlight to spread optional chemical attractant molecules, which are released through the small holes, to attract mosquitoes.

6. The standing water container visually exposes water to the outside to attract mosquitoes.

Besides the individual effect of each mosquito attraction function above, the synthetic effect of multiple factor interaction on the mosquito is more effective and efficient than the simple summation of the individual effect. Synthetic action on mosquito is one of the major advantages of the sunlight and water utilized compound mosquito attraction apparatus.

The process and mechanism of operation of the mosquito attraction apparatus are described as the followings.

Water is added into the multi-function solar utilizer and the standing water container. In accordance with thermodynamics in physics, both inside the multi-function solar utilizer and the standing water container, water exists in both liquid state and gaseous state, and water in liquid state and water in gaseous state reach a corresponding point on the equilibrium curve of phase of water under certain temperature and certain pressure. The emphasis of the two states of water is because water in gaseous state plays an important role in the mechanism of the functions of the present mosquito attraction apparatus. In the multi-function solar utilizer, because the small holes on the upper part of the multi-function solar utilizer allow water passing through, the maximum amount of water in liquid state inside the multi-function solar utilizer is controlled by the height of the small holes at the lowest height level. Water in liquid state occupies lower part of space of the multi-function solar utilizer. Water in gaseous state and other components of air occupy the upper part of space of the multi-function solar utilizer. In the standing water container, the water in liquid state occupies lower part space of the standing water container so that the upper surface of the water in liquid state can be seen from outside. Water in gaseous state and other components of air occupy the upper part of space of the standing water container. The sunlight and water utilized compound mosquito attraction apparatus, which is inside a complete mosquito attraction and killing system, is placed at a location where direct sunlight could be received.

When the multi-function solar utilizer is in sunlight, the multi-function solar utilizer absorbs solar energy with high efficiency due to the darkness of its outer surface. Because dark color material has high sunlight absorbing efficiency, the multi-function solar utilizer can absorb significantly greater amount of solar energy than common objects in its environment do when it is under direct sunlight. The absorbed solar energy will be transformed into infrared radiation to attract mosquitoes. The absorbed solar energy will also be used to evaporate water and other optional chemical attractant inside the multi-function solar utilizer to attract mosquitoes.

Water in the multi-function solar utilizer regulates the temperature and the associated total radiation power of infrared of the multi-function solar utilizer. The water in the multi-function solar utilizer regulates the temperature and the associated total radiation power of infrared in the following ways. First, because water has very high specific heat, it functions as an energy reservoir to control the speed of temperature change. The specific heat of water is the highest among common substances. The specific heat of water is around eight times of that of steel and five times of that of aluminum. Therefore, utilizing water to control speed of temperature change is very effective and very economical. When the multi-function solar utilizer is under direct sunlight, the water temperature slowly increases. When the multi-function solar utilizer is not under direct sunlight or is in the time of night, the water temperature slowly decreases. Second, when temperature of the water increases, due to the move of the equilibrium point of water, gaseous state water increases, this evaporation process of water consumes large amount of absorbed solar energy and therefore is a force against the temperature increase. This regulation lets temperature of water not too high under direct sunlight and not too low without direct sunlight. Therefore, the temperature of water and the associated total radiation power of infrared of water can be kept in a range for a long time. This range of temperature and associated total radiation power of infrared is used to attract mosquitoes. The water is inside the multi-function solar utilizer when the apparatus is in operation. Therefore, this process of regulation of temperature and associated total radiation power of infrared by water is a self-regulated process of the present mosquito attraction apparatus.

The small holes on the upper part of the multi-function solar utilizer directly release specific infrared radiated by liquid state water and gaseous state water and spread gaseous state water to attract mosquitoes.

Infrared directly radiated from the small holes has two important effects. First, it shows an infrared radiation source with attractive temperature. Second, it shows an infrared radiation source with spectrum characteristic of water.

Infrared radiation has two fundamental characteristics. The first fundamental characteristic is its temperature characteristic. The second characteristic is its spectrum characteristic. All objects in environment radiate infrared with these two characteristics. Mosquitoes are infrared sensitive. Both of the two fundamental characteristics of infrared are utilized to stimulate infrared sensitive mosquitoes.

Infrared radiation with a temperature characteristic in the range of temperature of human beings and birds is utilized to attract mosquitoes that intend to bite human beings and birds. Because the dark color outer surface of the multi-function solar utilizer absorbs sunlight with high efficiency, its inner temperature is significantly higher than its environment temperature. Because of the temperature regulation effect of water discussed above, the temperature of the water inside the multi-function solar utilizer will be in the range that shows temperature characteristic of human beings and birds for a significantly long time after absorbing sunlight. In the aspect of utilization of infrared temperature characteristic, the multi-function solar utilizer transforms sunlight into the infrared radiation with temperature characteristic similar to that of human beings and birds and radiates the infrared through the small holes to attract mosquitoes that intend to bite human beings and birds.

Infrared radiation with a temperature characteristic of attractive hiding place for mosquitoes in the seasons of early spring and late fall is utilized to attract mosquitoes that intend to hide in a warm place in the environment of low temperature of early spring and late fall. During the seasons of early spring and late fall, environmental temperature sometimes is in the high range that allows mosquitoes to be active and sometimes is in the low range that can kill mosquitoes. When environmental temperature is in the low range, mosquitoes intend to find and hide in a place that is warmer than the environment. Because the dark color outer surface of the multi-function solar utilizer absorbs sunlight with high efficiency, the temperature of the body of the multi-function solar utilizer and the water inside is significantly higher than that of the environment. Because of the high specific heat of the water inside, the multi-function solar utilizer can keep its temperature higher than that of the environment for significant long time. Therefore, in another aspect of utilization of infrared temperature characteristic, the multi-function solar utilizer transforms sunlight into the infrared radiation with temperature characteristic of warm place to attract mosquitoes that intend to search a warm place when environment temperature is dangerously low for mosquitoes.

Infrared radiation with spectrum characteristic of water is utilized to attract mosquitoes that intend to lay their eggs in water. Infrared radiated by gaseous state water and liquid state water radiates from the small holes to shows unique infrared spectrum characteristic of water. The infrared radiation with unique infrared spectrum characteristic of water is to act on infrared sensitive mosquitoes to show the existence of water. In the aspect of utilization of infrared spectrum characteristic, the multi-function solar utilizer transforms sunlight into the infrared radiation with spectrum characteristic of water and radiates the infrared through the small holes to attract mosquitoes that intend to search water to lay eggs.

The multi-function solar utilizer also utilizes sunlight to spread gaseous state water and optional chemical attractant gaseous state molecules through the small holes to the local space surrounding the multi-function solar utilizer to attract mosquitoes.

When the body of the multi-function solar utilizer absorbs sunlight, the inside temperature increases. With the increase of the inside temperature, the amount of gaseous state water increases due to the move of the corresponding point on the equilibrium curve of phase of water. The small holes release the gaseous state water to the outside. The gaseous state water shows mosquitoes the existence of water to attract mosquitoes that intend to search water to lay eggs.

Optionally, chemical attractant can be added into the water inside the multi-function solar utilizer. With the increase of the inside temperature of the multi-function solar utilizer due to the absorption of sunlight, the amount of chemical attractant in gaseous state increases in accordance with the move of corresponding point on the equilibrium curve of the phase of the chemical attractant solution. The small holes release the gaseous state chemical attractant to the outside. The gaseous state chemical attractant attracts mosquitoes.

The above discussions about the process and mechanism of the multi-function solar utilizer show that the multi-function solar utilizer utilizes sunlight to attract mosquitoes in variety of ways.

Connected with the multi-function solar utilizer, the standing water container attracts mosquitoes by utilization of water in a way of direct visual attraction.

The wall of the standing water container is transparent. The transparent wall of the standing water container does not allow mosquitoes to directly contact with the container water. In operation, the inner space of the standing water container should be partially occupied by water to clearly show the existence of water. Besides the signals from the infrared radiation and the gaseous state water that are released from the small holes of the multi-function solar utilizer, the standing water container sends a visual image of water to attract mosquitoes that intend to lay their eggs in water. Because of the blockage action of the wall, the present mosquito attraction apparatus ensures that mosquitoes cannot lay eggs in the water even when mosquitoes accidentally penetrate the mosquito killing system surrounding the mosquito attraction apparatus.

The functions of the multi-function solar utilizer and the standing water container are synthetic and complementary. In the aspect of electromagnetic wave spectrum of water, the multi-function solar utilizer uses infrared rays to show the existence of water and the standing water container uses visible rays to show the existence of water. In the aspect of state of water, the multi-function solar utilizer uses sensible water molecules of gaseous state water to show the existence of water and the standing water container uses visible water surface of liquid state water to show the existence of water. In the aspect of temperature of water, the multi-function solar utilizer uses temperature range of human beings and birds and the standing water container uses temperature range of its environment. In the aspect of structure and material, the multi-function solar utilizer is dark and the standing water container is transparent. The combination of the functions of the two parts lets the present mosquito attraction apparatus utilize sunlight and water to attract mosquitoes with more effectiveness and more efficiency.

To form a mosquito control system that solely uses natural resources of sunlight and water to attract and kill mosquitoes, the present invention also provide an energy efficient sunlight powered mosquito killing system to kill mosquitoes by solely using natural resource of sunlight in the time of both day and night and in variety of weather conditions with both sufficient and insufficient sunlight.

The energy efficient sunlight powered mosquito killing system comprises: (1) a group of solar cells to transform sunlight to electricity of direct current; (2) a group of rechargeable batteries to store energy of the electricity from the group of solar cells and to release electricity of direct current to electronic circuit of the system; (3) an electronic switch to execute a periodic control process to let the system alternatively in state of electricity supply with a certain time duration and state of electricity non-supply with a certain time duration in a pattern of period; (4) an electronic oscillator to transform the direct current from the group of rechargeable batteries and the group of solar cells into oscillating current; (5) an voltage step-up transformer to transform low voltage input of the oscillating current into high voltage output; (6) a one-way electronic circuit to generate one direction movement of electric charge; (7) a high voltage electric charge storage device to accumulate high voltage electric charge during the time of electricity supply and to keep the accumulated high voltage electric charge during the time of electricity non-supply; (8) an metal grid connected with the high voltage electric charge storage device to discharge the high voltage electric charge through bodies of mosquitoes.

To kill mosquitoes with electric charge, electric grid needs certain amount of high voltage electric charge. The voltage is commonly above 600 volts. A group of solar cells with a small size of a few square inches cannot provide required high voltage. The group of solar cells of a few square inches can only provide direct current with low voltage of a few volts. An electronic circuit is needed to transform the low voltage direct current into high voltage electric charge. However, the electronic circuit needs certain conditions in a certain instant power input level, a certain instant voltage input level, and a certain instant current input level to perform its function of transforming the low voltage direct current to high voltage electric charge.

To meet the requirement of the electronic circuit for the instant power input level, the instant voltage input level, and the instant current input level, a natural choice is to increase the total size of the group of solar cells that supplies electricity for the electronic circuit. However, this approach causes three problems. The first problem is that this approach results in increase of cost of the system due to high cost of solar cell. The second problem is that this approach cannot provide electricity during time of night and other time of insufficient sunlight. The third problem is that large size of the group of solar cells limits the options of physical form of the whole mosquito attraction and killing system. The present energy efficient sunlight powered mosquito killing system uses another approach.

This approach is based on two characteristic facts. The two characteristic facts are that mosquitoes touch the electric grid of the mosquito killing system in a random way and mosquitoes touch the electric grid of the mosquito killing system in a relatively low time rate in most of places, especially in most of yards of people's houses. The time rate here is defined as, for a period of time, times of mosquito touching the grid divided by the length of the time. For example, the time rate could be 30 times per hour. The low time rate means that mosquitoes do not touch the electric grid a few times in every second in average. Because mosquitoes touch the electric grid in a random way, the mosquito killing system should be kept in a mosquito killing ready status. In another aspect, because mosquitoes touch the electric grid in a low time rate, the consumption of high voltage electric charge is low.

The present energy efficient sunlight powered mosquito killing system uses one periodic control process and two energy reservoirs to let the power source of the system meet the requirement for instant power input level, instant voltage input level, and instant current input level of the electronic circuit of the system. The control process and the structure of the system also let the energy efficient sunlight powered mosquito killing system possess the characteristic of performing the function of mosquito killing during both daytime and nighttime.

The periodic control process is of letting the mosquito killing system alternatively in electricity supply state with a time duration named T(s) and in electricity non-supply state with a time duration named T(n).

The first energy reservoir is a group of rechargeable batteries. When the mosquito killing system is in the electricity non-supply time, the group of rechargeable batteries receives and reserves the electric energy from the group of solar cells. When the mosquito killing system is in the electricity supply time, the group of rechargeable batteries releases the accumulated electric energy. During the state of electricity supply, both the group of solar cells and the group of rechargeable batteries provide electric energy to the electronic circuit.

The second energy reservoir is a high voltage electric charge storage device, such as a capacitor, connected with a one-way electronic circuit. When the mosquito killing system is in the electricity supply state, the high voltage electric charge storage device receives and reserves the high voltage electric charge. When the mosquito killing system is in the electricity non-supply time, the high voltage electric charge storage device reserves the high voltage electric charge. The high voltage electric charge storage device accumulates and reserves the high electric charge until a mosquito touches the electric grid to trigger an electric discharge.

When the mosquito killing system is in the electricity supply state, the electric current from the group of solar cells and the group of rechargeable batteries flows through the electronic switch to supply electric power for the electronic circuit of the system. When the mosquito killing system is in the electricity non-supply state, the electric current from the group of solar cells and the group of rechargeable batteries cannot flow through the electronic switch to supply electric power for the electronic circuit of the system, and the electric energy generated by the group of solar cells reserves in the group of rechargeable batteries. In the process of letting the mosquito killing system alternatively be in electricity supply state and electricity non-supply state, when the ratio of the time duration T(n) of electricity non-supply to the time duration T(s) of electricity supply increases, the electric energy reserved in the group of rechargeable batteries increases. By increasing the ratio of time duration T(n) of electricity non-supply to time duration T(s) of electricity supply, the mosquito killing system obtains the capability of killing mosquitoes at the time of night and at other time of insufficient sunlight due to the increase of reserved energy in the group of rechargeable batteries.

To make the supply time of the low voltage direct current from the group of rechargeable batteries as long as possible, the time duration T(s) of electricity supply should be as short as possible, and the ratio of time duration T(n) of electricity non-supply to time duration T(s) of electricity supply should be as large as possible. To make discharge times of high voltage electric charge on the high voltage electric charge storage device to kill mosquitoes as large as possible, the time length of the period of the control process should be as small as possible.

The energy efficient sunlight powered mosquito killing system provides a solution for: (1) allowing the sunlight powered mosquito killing system to continuously stay in mosquito killing status during both daytime and nighttime; (2) allowing total size of the group of solar cells of the sunlight powered system to be significantly small. The solution realizes the goal of utilizing sunlight economically, effectively and efficiently.

Combining the sunlight and water utilized compound mosquito attraction apparatus and the energy efficient sunlight powered mosquito killing system, a complete mosquito attraction and killing system, which is solely uses natural resources of sunlight and water to attract and kill mosquitoes, is obtained.

This mosquito attraction and killing system can solely use natural resources of sunlight and water to attract and kill mosquitoes and can continuously perform its functions of mosquito attraction and mosquito killing during both daytime and nighttime.

DETAILED DESCRIPTION OF THE INVENTION

The detailed description of the invention is described in three parts. The first part is the preferred embodiment of the sunlight and water utilized compound mosquito attraction apparatus. The second part is the preferred embodiment of the energy efficient sunlight powered mosquito killing system. The third part is the preferred embodiment of a complete mosquito attraction and killing system that is combined by the sunlight and water utilized compound mosquito attraction apparatus and the energy efficient sunlight powered mosquito killing system.

The sunlight and water utilized compound mosquito attraction apparatus comprises two major parts. The first major part is the multi-function solar utilizer. The second major part is the standing water container. The two major parts are connected together to form the sunlight and water utilized compound mosquito attraction apparatus.

The multi-function solar utilizer has three basic characteristics in structure and material. The first characteristic is that the lower part of the multi-function solar utilizer is capable of containing liquid, such as water. The second characteristic is that on the upper part of the multi-function solar utilizer, there are a number of small holes which are channels to release inner gaseous molecules and inner infrared radiation to the outside of the multi-function solar utilizer. The third characteristic is that the outer surface of the multi-function solar utilizer is of dark color, such as black.

The standing water container has one basic characteristic in structure and material. The characteristic is that the wall of the standing water container is transparent so that the upper surface of contained water can be seen from outside. It is also emphasized that the transparent wall of the standing water container does not allow mosquitoes to directly contact with the contained water so that mosquitoes cannot lay eggs inside the standing water container in any situation.

The preferred physical form of the mosquito attraction apparatus is a column with the multi-function solar utilizer as the upper part and the standing water container as the lower part of the column. The physical form of the column of the sunlight and water utilized compound mosquito attraction apparatus provides important advantage of convenience in usage and manufacture. The arrangement that the multi-function solar utilizer is on the upper part of the column is to make water supplement of the multi-function solar utilizer by the user more convenient and to make utilization of water of rain for the water supplement more convenient.

Figure 1:
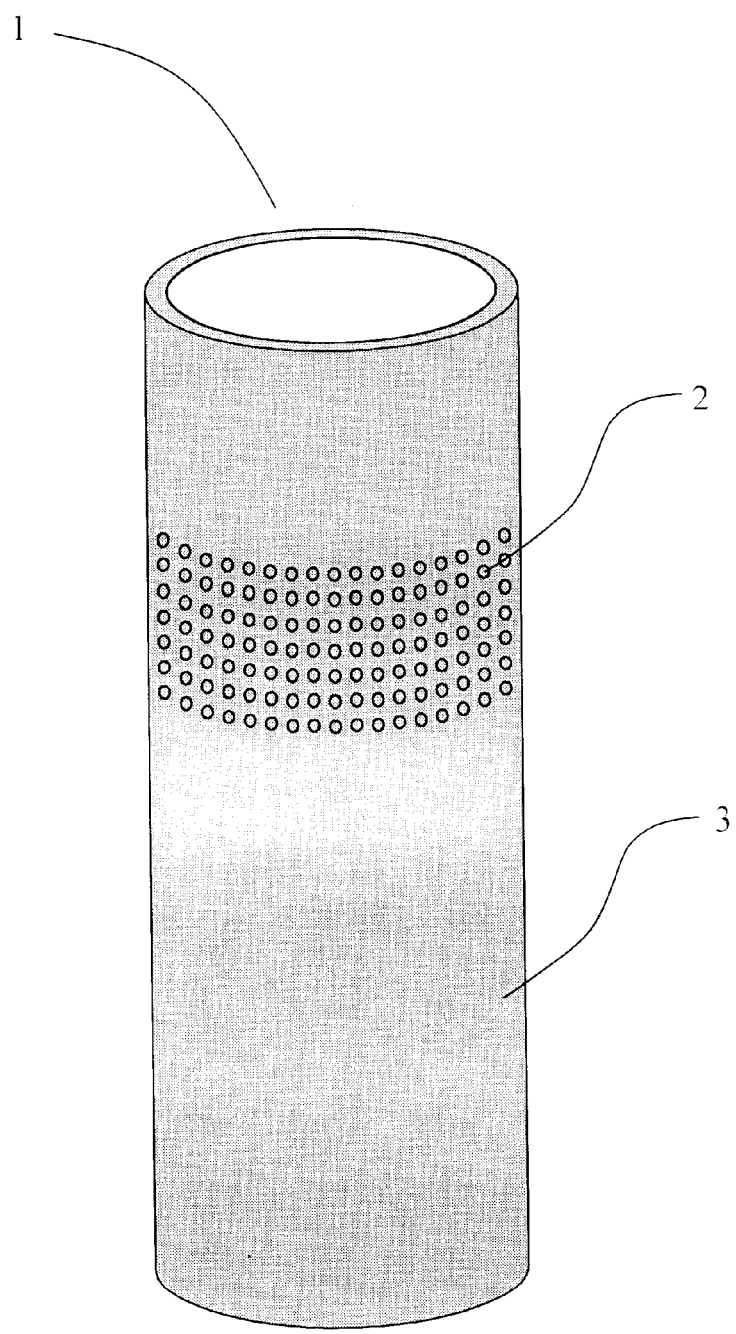
FIG. 1 shows a multi-function solar utilizer. The basic structure is a cylinder. The top of the cylinder is open and the bottom of the cylinder is closed. The color of the outer surface of the cylinder is dark. There are open small holes on upper part of the wall of the cylinder.
Figure 2:
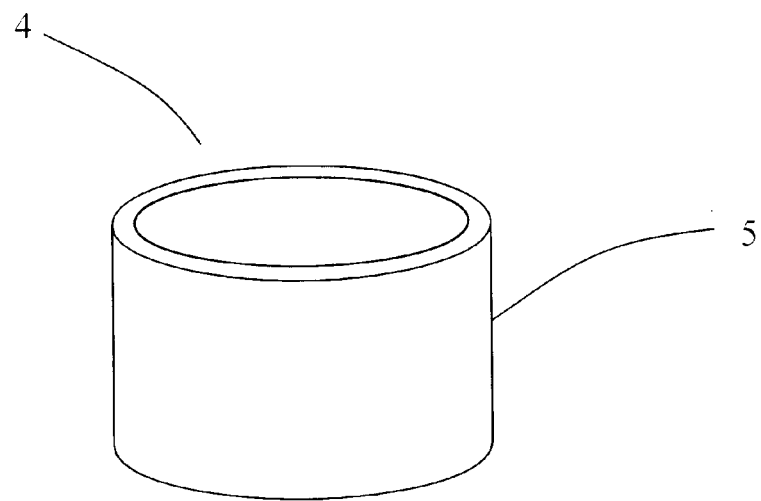
FIG. 2 shows a standing water container. The basic structure is a cylinder. The top of the cylinder is open and the bottom of the cylinder is closed. The wall of the cylinder is transparent.
Figure 3:
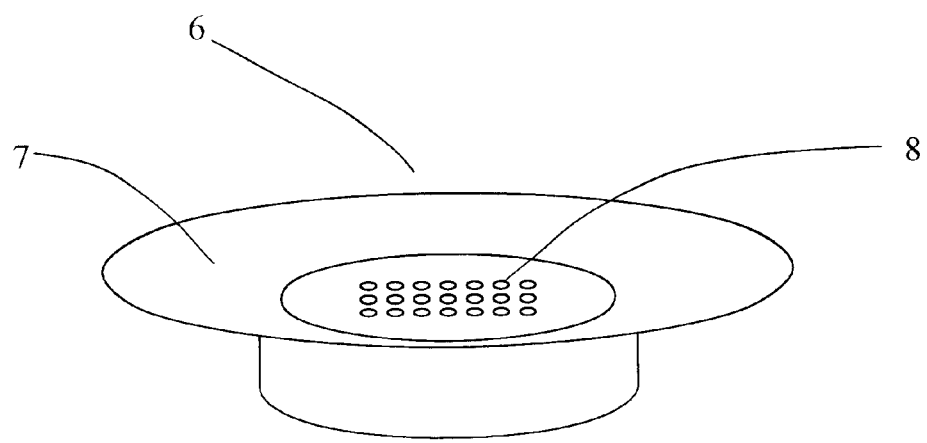
FIG. 3 shows a rain collection cover. The basic structure is a cylinder with a broad brim. The top of the cylinder is closed and the bottom of the cylinder is open. There are open holes on the top of the cylinder.
Figure 4:
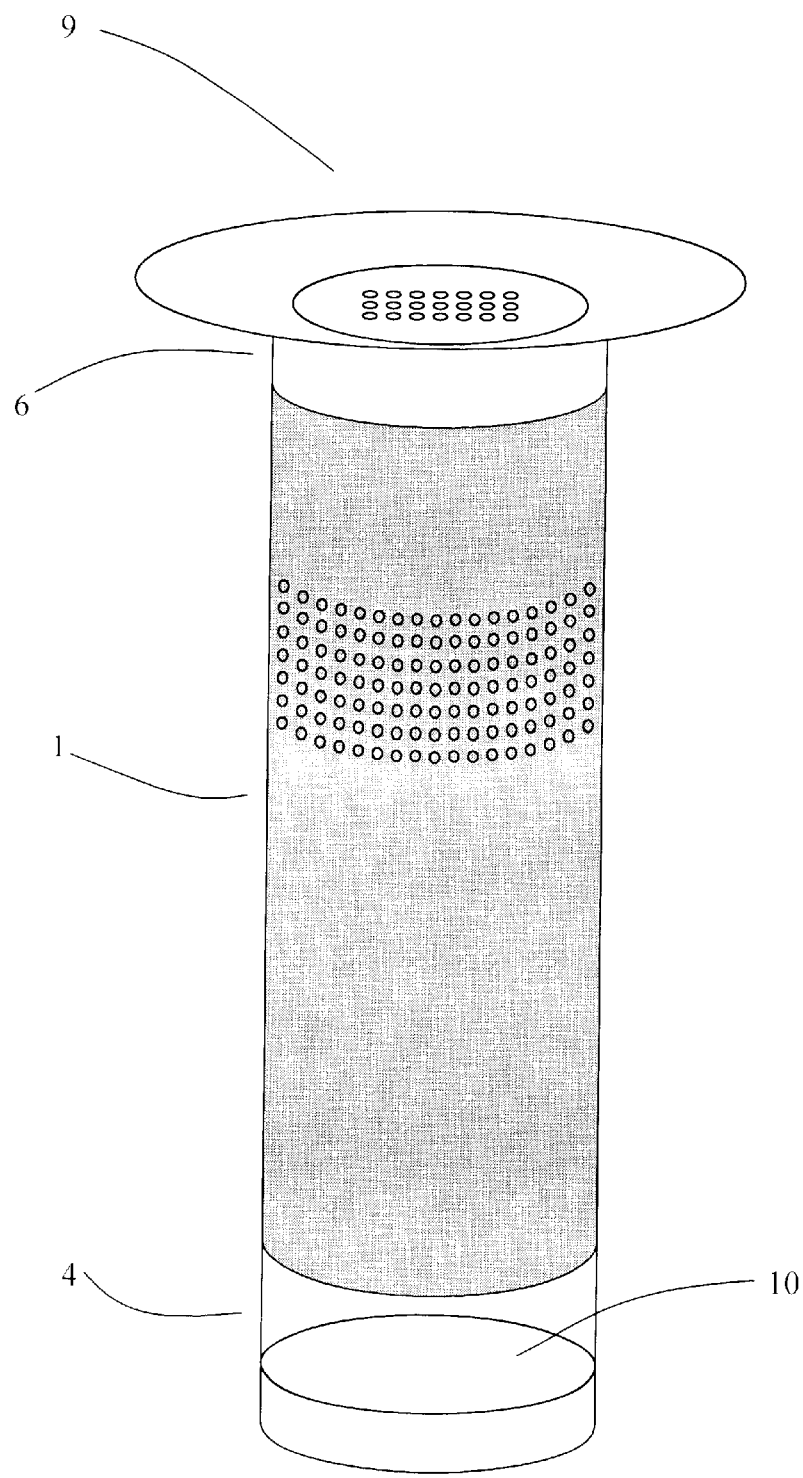
FIG. 4 shows a complete form of the sunlight and water utilized compound mosquito attraction apparatus. The figure is obtained by combination of the rain collection cover, the multi-function solar utilizer, and the standing water container. Water is inside the standing water container. The upper surface of the water is shown.

In the preferred embodiment of the sunlight and water utilized compound mosquito attraction apparatus, there are three parts, as separately shown by FIG. 1, FIG. 2, and FIG. 3. These three parts include a multi-function solar utilizer, a standing water container, and a rain collection cover. Combination of the three parts forms a complete sunlight and water utilized compound mosquito attraction apparatus, as shown by FIG. 4.

FIG. 1 shows the preferred embodiment of the multi-function solar utilizer 1. The basic form of the multi-function solar utilizer is a cylinder. The bottom part of the cylinder is closed so that the cylinder can contain water. The top part of the cylinder is open so that water can be added into the cylinder through the opening. On the upper part of the wall of the cylinder, there are number of open small holes 2. The small holes are the channels from the inside of the cylinder to the outside of the cylinder. The diameter of the small holes is in such range that mosquitoes cannot pass through the small holes. These small holes allow infrared radiation and gaseous state water directly pass through from the inside to the outside of the cylinder. The outer surface 3 of the cylinder is of dark color.

When the multi-function solar utilizer is to be used, water is added into the lower part of the cylinder. The maximum amount of water is automatically controlled by the height of the lowest level of the small holes on the wall of the cylinder. If the water level is higher than the height of the lowest level of the small holes, water is to flow to the outside of the cylinder. Initially, water could be added into the cylinder by the user. When the cylinder is under use in the environment that is outside houses, rain can supplement water to the cylinder through its cover with holes to reduce the need to add water by the user.

FIG. 2 shows the preferred embodiment of the standing water container 4. In the preferred embodiment of the standing water container, the basic structure of the standing water container is a cylinder with the same outer diameter as that of the multi-function solar utilizer. The wall 5 of the cylinder is transparent. The bottom part of the cylinder is closed so that the cylinder can contain water. The top part of the cylinder is open to allow water to be added into the cylinder through the opening. The top part of the cylinder of the standing water container is connected with the bottom part of the cylinder of the multi-function solar utilizer. Because of this form of connection, the standing water container is completely closed.

When the standing water container is to be used, water is added into the cylinder. The water does not occupy all the space inside the cylinder. The upper surface of the water can be seen from outside through the transparent wall of the cylinder to show the existence of water.

FIG. 3 shows the rain collection cover 6. There is a broad brim 7 on the top of the cover to increase the capacity of rain collection of the rain collection cover. There are some small holes 8 on the top of the cover. The small holes allow the collected water of rain to enter the cylinder of the multi-function solar utilizer. The size of the small holes does not allow mosquitoes to pass through.

The rain collection cover is connected with the top of the cylinder of the multi-function solar utilizer. The rain collection cover prevents mosquitoes from entering the cylinder of the multi-function solar utilizer, and collects rain to reduce the burden of manually adding water into the cylinder of the multi-function solar utilizer.

FIG. 4 shows the complete form of the preferred embodiment of the sunlight and water utilized compound mosquito attraction apparatus 9. The cylinder of the multi-function solar utilizer, the cylinder of the standing water container, and the rain collection cover form a column with a broad brim. In FIG. 4, the upper surface 10 of the water inside the cylinder of the standing water container is presented to describe the way of use of the apparatus.

When the sunlight and water utilized compound mosquito attraction apparatus is added with water, inserted into a mosquito attraction and killing system, and placed under sunlight, the apparatus performs six mosquito attraction functions synthetically and complementarily.

First, the multi-function solar utilizer transforms sunlight into infrared that is with temperature characteristic of human beings and birds to attract mosquitoes.

Mosquitoes are infrared sensitive and intend to search bodies of human beings and birds. Therefore, infrared with the specific characteristics of bodies of human beings and birds is to be utilized to present existence of human beings and birds.

The multi-function solar utilizer uses specific characteristics of the water contained in the cylinder, the small holes on the wall of the cylinder, and the dark color outer surface of the cylinder to realize that the multi-function solar utilizer radiates infrared with temperature characteristic of human beings and birds for a significantly long time.

The dark color outer surface of the wall of the cylinder of the multi-function solar utilizer absorbs sunlight with high efficiency due to the dark color of its outer surface. The absorbed energy of sunlight lets the temperature of the wall of the cylinder increase. The increase of temperature of the wall of the cylinder then lets the temperature of the water inside the cylinder increase. Because the dark color outer surface of the cylinder absorbs sunlight much more efficiently than most natural objects in its environment, the inside temperature of the cylinder is usually significantly higher than the environment temperature. The wall of the cylinder and the water inside the cylinder therefore are very noticeable infrared emitting sources in the environment. It should be noticed that the multi-function solar utilizer is in the form of cylinder and direct sunlight can only be on one half of the outer surface at any time. Even though the temperature on the one half surface with direct sunlight could be significantly higher than temperatures of human beings and birds, the temperature on the other half surface without direct sunlight should be in the range of temperatures of human beings and birds, which is determined by the temperature of the water inside the cylinder and the temperature of the outside environment. It also should be noticed that when the cylinder is not under direct sunlight, the temperature of the outer surface of the cylinder should be in the range of temperatures of human beings and birds for a significantly long time, which is determined by the temperature of the water inside the cylinder and the temperature of the outside environment.

The multi-function solar utilizer uses two temperature control processes to let the temperature of the water in a range that is similar to the temperature ranges of the outer surfaces of human beings and birds.

The first process is to use the water inside the cylinder as a heat reservoir to control the speed of temperature change. The lower part of the cylinder contains certain amount of liquid state water. In accordance with thermal dynamics in physics, liquid state water can reserve large amount of heat energy due to its very high specific heat. The specific heat of liquid state water is 4.5 times as that of aluminum, 9.1 times as that of iron, 16.7 times as that of silver, and 33.3 times as that of gold. The very high specific heat of liquid state water lets the water inside the cylinder of the multi-function solar utilizer possess high heat energy capacity and therefore function as a heat energy reservoir. The action of the heat energy reservoir causes the speed of the temperature change of the water to be slow.

The second process is to use the evaporation of the water inside the cylinder and the thermal exchange of the water inside the cylinder with its environment to take out increased amount of heat energy when the temperature of the water increases. The small holes on the wall of the cylinder play important role in this process. In accordance with thermal dynamics in physics, if temperature increases, evaporation of water increases under the condition that air pressure does not change; and if air pressure decreases, evaporation of water increases under the condition that temperature does not change. In accordance with thermal dynamics in physics, evaporation takes out large amount of heat energy from water. The thermal dynamics is applied to the functional process of the multi-function solar utilizer. When the temperature inside the cylinder increases, evaporation of the water inside the cylinder increases. Importantly, when evaporation of the water inside the cylinder increases, the small holes on the wall of the cylinder release the gaseous state water from the inside to the outside of the cylinder so that the air pressure inside the cylinder does not increase when the temperature inside the cylinder increases. Therefore the small holes on the wall of the cylinder help the increase of the evaporation of the water when the inside temperature increases. Therefore, the gaseous state water that can be continuously released through the small holes on the wall of the cylinder can continuously take out larger and larger amount of energy from the inside to the outside of the cylinder with the increase of the inside temperature. In accordance with thermal dynamics in physics, if the temperature difference between two contacted bodies increases, the speed of thermal exchange between the two bodies increases. It is emphasized that the speed of heat energy release by this heat energy releasing process varies with the temperature difference between the temperature of the water inside the cylinder and the temperature of the environment of the water. This is a very important factor in the mechanism of the temperature control of the water. With the increase of the temperature of the water inside the cylinder, temperature difference between the water and its environment increases. Then the thermal exchange increases. The increased thermal exchange causes higher amount of heat energy to flow out the water to its environment.

Because of the joint action of the two processes of heat energy reserving and heat energy releasing, when the multi-function solar utilizer is under direct sunlight, the temperature of the multi-function solar utilizer first increases to a level that is significantly higher than its environment with a relatively high speed, and then increases with a much slower speed; when the multi-function solar utilizer is not under direct sunlight after its temperature increase, the temperature decreases with a lower and lower speed. Therefore, the temperature of the multi-function solar utilizer is in a range that is usually close to the temperature range of human beings and birds for a significantly long time. The infrared radiated from the multi-function solar utilizer therefore shows the temperature characteristic of human beings and birds for a significantly long time.

Second, the multi-function solar utilizer transforms sunlight into infrared that is with spectrum characteristic of water to attract mosquitoes.

Mosquitoes are infrared sensitive and mosquitoes that bite human beings and birds intend to search water to lay eggs. Therefore, noticeable infrared with specific spectrum characteristic of water is to be utilized to show the existence of water.

The multi-function solar utilizer uses specific characteristics of the water contained in the cylinder, the small holes on the wall of the cylinder, and the dark color outer surface of the cylinder to realize that the multi-function solar utilizer radiates noticeable infrared with spectrum characteristic of water.

In accordance with infrared spectroscopy in physics, the water contained inside the cylinder of the multi-function solar utilizer radiates infrared with its specific spectrum characteristic at all the time. The small holes on the wall of the cylinder of the multi-function solar utilizer let the infrared pass through the wall of the cylinder to the outside. When the dark color outer surface of the cylinder absorbs sunlight with high efficiency, the temperature of the inside water increases and therefore the infrared with the spectrum characteristic of water intensifies and is more noticeable to mosquitoes.

Third, the multi-function solar utilizer uses sunlight to increase humidity around the cylinder to stimulate mosquitoes.

When mosquitoes are in the environment of high level humidity, they are more active. The multi-function solar utilizer creates a local high level humidity to stimulate mosquitoes around it.

Inside the cylinder of the multi-function solar utilizer, due to the existence of the water, density of gaseous state water just above the surface of the water is significantly higher than that of the environment of the cylinder, in accordance with thermal dynamics in physics. When the cylinder is under direct sunlight, the dark color outer surface absorbs sunlight with high efficiency and then the temperature inside the cylinder increases. In accordance with thermal dynamics in physics, if temperature increases and air pressure does not change, amount of gaseous state water increases. When the temperature inside the cylinder increases, the amount of gaseous state water increases and the small holes on the wall of the cylinder release the gaseous state water to the outside. Due to the existence of the small holes on the wall, increased generation of gaseous state water from the inside water is a continuous process. The continuously generated and released gaseous state water lets the humidity in the local space around the wall of the cylinder increase. The increased humidity lets mosquitoes around the cylinder of the multi-function solar utilizer to be more active and results in higher probability of mosquito touching a mosquito killing system, such as high voltage electric grid, which is around the mosquito attraction apparatus.

Fourth, the multi-function solar utilizer uses sunlight to create a warm object in the seasons of early spring and late fall to attract mosquitoes.

During the fluctuation of environment temperature in the seasons of early spring and late fall, environment temperature could decrease to certain level that can kill mosquitoes. Mosquitoes intend to search a warm place to hide. This warm place is not necessarily in the temperature range of human beings and birds. The multi-function solar utilizer creates such a warm object to attract mosquitoes.

The dark color outer surface of the wall of the cylinder of the multi-function solar utilizer absorbs sunlight with high efficiency when the cylinder is under direct sunlight. The absorbed solar energy lets the cylinder significantly warmer than its environment. The action of heat reservoir of the water inside the cylinder lets the speed of temperature decrease of the cylinder lower than that of the environment and therefore shows a warmer object in the low temperature environment.

This action of mosquito attraction and associated mosquito killing is extremely important to reduce peak value of mosquito population. When the value of mosquito population is at low point due to environment temperature, any additional one killed mosquito could result in thousands of decrease of peak value of mosquito population in probability.

Fifth, the multi-function solar utilizer uses sunlight to effectively spread optional chemical attractant molecules to attract mosquitoes.

Mosquitoes are attracted by certain kinds of chemical attractants. These chemical attractants generally can be dissolved in water. The multi-function solar utilizer provides a way of spread of the chemical attractants.

Optionally, chemical attractant can be put into the cylinder of the multi-function solar utilizer and be dissolved in the water contained inside the cylinder. The small holes on the wall of the cylinder release the smell of the chemical attractant to the environment. The dark color outer surface of the wall of the cylinder absorbs sunlight with high efficiency when the cylinder is under direct sunlight. The absorbed solar energy lets the temperature inside the cylinder increase and therefore causes the release speed of the chemical attractant increase.

Sixth, the standing water container visually exposes water to the outside to attract mosquitoes.

Water is a necessity for reproduction of mosquitoes. Female mosquitoes that intend to bite human beings and birds intend to search water to lay eggs. The standing water container provides visible standing water for mosquitoes.

In operation, the cylinder of the standing water container contains water with its partial space to make the upper surface of the water be visible through its transparent wall. The top part of the cylinder of the standing water container is connected with the closed bottom part of the cylinder of the multi-function solar utilizer. After the standing water container is connected with the multi-function solar utilizer, the standing water container is completely closed. Therefore, mosquitoes can see the water and be attracted by the water but cannot lay eggs in the water in any situation.

These mosquito attraction functions are synthetic and complementary in one integrated mosquito attraction apparatus. The synthetic action of the above six mosquito attraction functions in one integrated apparatus intensifies the effect of each individual mosquito attraction function on the mosquito. One example is shown by the followings. The infrared radiated from the small holes that carries characteristic of water stimulates the mosquito to let the mosquito feel the existence of water. The vapor of water released from the small holes stimulates the mosquito to let the mosquito feel the existence of water. The water inside the standing water container stimulates the mosquito to let the mosquito feel the existence of water. These three different kinds of stimulation act on the mosquito in different kinds of reception stimulations. Inside the mosquito, these three different kinds of reception stimulations interact each other and confirm each other. The multiple factor synthetic confirmation eliminates many disturbances associated with any one single factor and thus is much more conclusive than any one single factor confirmation. Therefore, the synthetic effect of the three different kinds of stimulations to the mosquito is not a simple summation of the three stimulation effects, and is much more effective and efficient than the simple summation of the three stimulation effects. The above example shows the synthetic effect of the apparatus. The synthetic effect from the numerous combinations of the six mosquito attraction functions is in multiple aspects. The synthetic effect from the large number of combinations of multiple individual functions in one integrated apparatus is one of the major advantages of the sunlight and water utilized compound mosquito attraction apparatus.

The advantages of the embodiment of the sunlight and water utilized compound mosquito attraction apparatus also include that it needs very limited maintenance effort of its user. Even zero maintenance effort is achievable by adjusting some factors.

The standing water container is closed so that the water and the vapor of the water inside the standing water container are strictly kept inside. Because the standing water container is closed, when evaporation increases with the increase of water temperature, air pressure increases. The increase of the air pressure would reduce the evaporation of the water in accordance with thermal dynamics in physics. Water in liquid state and water in gaseous state will reach balance under certain temperature and certain pressure. Therefore, water in liquid state always exists inside the standing water container and the upper surface of the water inside the standing water container can always been seen from outside, due to the closeness of the standing water container. There is no need to add water into the standing water container during its usage after the initial water-adding.

The multi-function solar utilizer would release the vapor of the water contained to the outside so that there is certain amount of water consumption during the use. The small holes on the cover of the multi-function solar utilizer would allow water of rains to supplement the water contained. After the user initially adds water into the standing water container and the multi-function solar utilizer, the user only needs to add water to the multi-function solar utilizer when the consumption of the water is quick and the supplement from the rain is not enough. Some factors determine the speed of consumption of the water inside the multi-function solar utilizer. One of the factors is the height of the lowest level of the small holes of the cylinder of the multi-function solar utilizer. The greater the height, the more the water contained. Another factor is the ratio of the diameter of the top of the cover to the diameter of the cylinder. The greater this ratio, the more the amount of water supplement from rains. Therefore, it is achievable that user maintenance effort can be reduced to zero through changing these factors.

Another advantage of the embodiment of the sunlight and water utilized compound mosquito attraction apparatus is its simplicity. Although the sunlight and water utilized compound mosquito attraction apparatus performs multiple mosquito attraction functions at the same time, its physical form is very simple. The embodiment of the sunlight and water utilized compound mosquito attraction apparatus only has three parts, including the cover, the cylinder of the multi-function solar utilizer, and the cylinder of the standing water container. The three parts could be connected by a very simple way, such as thread. The simple physical form allows the cost of the apparatus to be very low. The simple physical form allows the use of it to be very convenient. The simple physical form allows it to be integrated with other parts of a complete mosquito attraction and killing system conveniently.

The energy efficient sunlight powered mosquito killing system comprises eight major components and performs its function under one periodic control process.

The eight major components comprise: (1) a group of solar cells to transform sunlight to electricity of direct current; (2) a group of rechargeable batteries to store energy of the electricity from the group of solar cells and to release electricity of direct current to electronic circuit of the system; (3) an electronic switch to execute a periodic control process to let the system alternatively in state of electricity supply with a certain time duration and state of electricity non-supply with a certain time duration in a pattern of period; (4) an electronic oscillator to transform the direct current from the group of rechargeable batteries and the group of solar cells into oscillating current; (5) an voltage step-up transformer to transform low voltage input of the oscillating current into high voltage output; (6) a one-way electronic circuit to generate one direction movement of high voltage electric charge; (7) a high voltage electric charge storage device to accumulate high voltage electric charge during the time of electricity supply and to keep the accumulated high voltage electric charge during the time of electricity non-supply; (8) an metal grid connected with the high voltage electric charge storage device to discharge the high voltage electric charge through bodies of mosquitoes.

In one period named T, the steps of the periodic control process comprise: (1) gate of the electronic switch being in the state of open to allow flowing of electric current from the group of rechargeable batteries and the group of solar cells to the electronic oscillator and voltage step-up transformer with a time duration named T(s); (2) gate of the electronic switch being in the state of close to block flowing of electric current from the group of rechargeable batteries and the group of solar cells to the electronic oscillator and voltage step-up transformer with a time duration named T(n).

During time of the first step, the mosquito killing system is in the state of electricity supply and solar energy collected by the group of solar cells is used to generate high voltage electric charge. During time of the second step, the mosquito killing system is in the state of electricity non-supply and solar energy collected by the group of solar cells is reserved in the group of rechargeable batteries.

The values of T, T(s), and T(n) affect the function of the mosquito killing system. If the ratio of T(n)/T(s) increases, the mosquito killing system increases its maximum of time of function of mosquito killing during the time of insufficient sunlight. If T decreases, the mosquito killing system increases its maximum of number of discharges of high voltage electric charge to kill mosquito for a certain length of time. Without considering cost of the electronic switch, increase of the ratio of T(n)/T(s) and decrease of T should result in better functional performance of the mosquito killing system. With considering the balance between cost of the electronic switch and functional performance of the system, it is satisfactory that the ratio of T(n)/T(s) is in the order of 10 and the value of T is in the order of 10 seconds.

Figure 5:
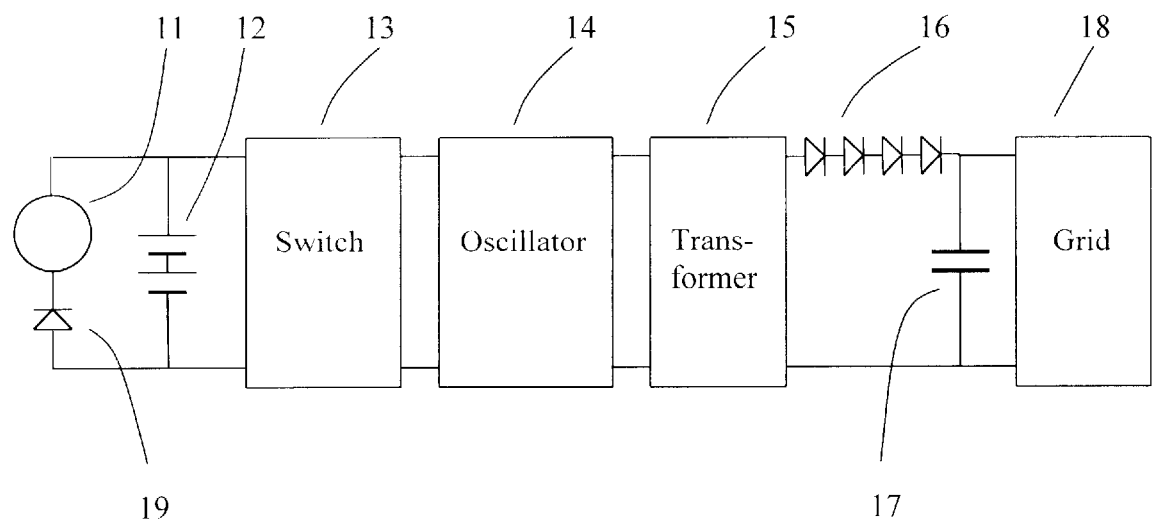
FIG. 5 shows a flow chart like circuit diagram of the energy efficient sunlight powered mosquito killing system. The circle on the left side without letter description inside represents a power source of a group of solar cells.
Figure 6:
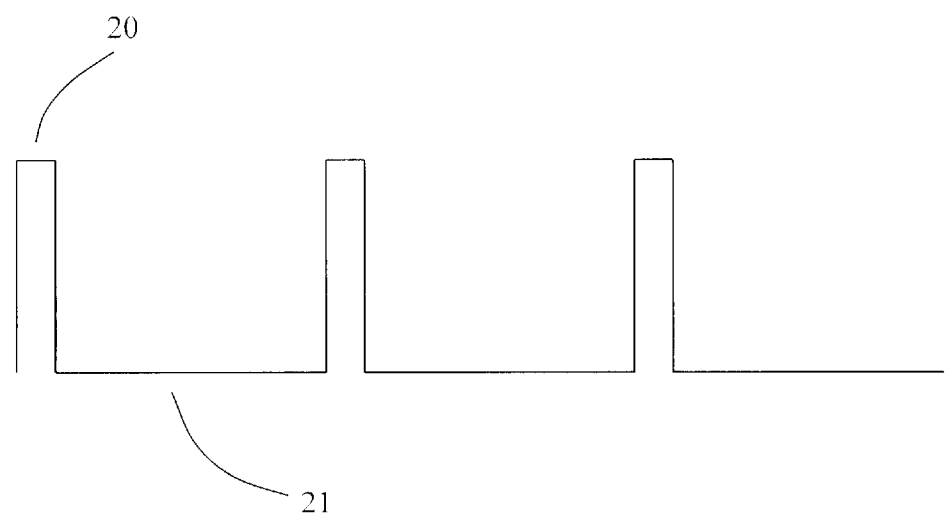
FIG. 6 shows a curve of electric current intensity of output of the electronic switch for the periodic control process of the system. The length in vertical dimension is the value of electric current intensity. The length in horizontal dimension is the value of time.

The preferred embodiment of the energy efficient sunlight powered mosquito killing system is presented by FIG. 5 and FIG. 6.

FIG. 5 is a flow chart like circuit diagram to show the structure of the system, which comprises a group of solar cells 11, a group of rechargeable batteries 12, an electronic switch 13, an electronic oscillator 14, a voltage step-up transformer 15, a group of diodes 16, a capacitor 17, and an electric grid 18. A diode 19 that connects the group of solar cells does not allow electric current from the group of rechargeable batteries to flow to the group of solar cells to reduce unnecessary energy consumption under the condition of insufficient sunlight on the group of solar cells.

FIG. 6 presents a curve of electric current intensity of output of the electronic switch to show the control process of the system. The length in vertical dimension is the value of electric current intensity. The length in horizontal dimension is the value of time. When the gate of the electronic switch is in the state of open, the output current intensity 20 is a non-zero value to make the electronic circuit of the system in the state of electricity supply. When the gate of the electronic switch is in the state of close, the output current intensity 21 is a zero value to make the electronic circuit of the system in the state of electricity non-supply.

It is emphasized that the structure of the system and the control process of the system are the specifications of the present invention. In the present invention, it is the arrangement of the components of the system and the way of the control that let the system possess its specific characteristics. It also should be pointed out that any one of the components of the system is market available. Therefore, the detailed and complicated electronic circuits of individual components of the system and the physical forms of the components are not shown in FIG. 5 and FIG. 6.

The group of solar cells is the power source of the system. The group of solar cells transforms sunlight into direct current. The group of solar cells is connected with the group of rechargeable batteries and connected with the electronic switch. When the system is in the state of electricity non-supply, the current from the group of solar cells flows into the group of rechargeable batteries. When the system is in the state of electricity supply, the current from the group of solar cells flows into the electronic switch. To reduce the cost of the system and to let the system fit variety of structures of mosquito control systems, the number and size of the solar cells in the group are limited within a small range. Due to the limit of the number and the size of the solar cells, the instant power output of the group of solar cells is generally not large enough to meet the minimum requirement for instant power input of the electronic oscillator. To let the electronic oscillator perform its function with required instant power input, the present invention uses a periodic process of accumulating energy of low instant power and releasing energy of high instant power.

The group of rechargeable batteries is the first energy storage component of the system. The group of rechargeable batteries is connected with the group of solar cells and connected with the electronic switch. The group of rechargeable batteries accumulates the energy that is generated by the group of solar cells when the system is in the state of electricity non-supply and releases the accumulated energy to the electronic switch when the system is in the state of electricity supply. The process of the charge and discharge of the group of rechargeable batteries is in a periodic way. If the time duration of the charge is significantly longer than the time duration of the discharge, the group of rechargeable batteries by itself can provide much higher instant power output than its instant power input received from the group of solar cells. Therefore, by increasing the ratio of time duration of electricity non-supply to time duration of electricity supply, the group of rechargeable batteries can reserve enough energy to provide required instant power for the system by itself when the group of solar cell cannot provide electricity during the time of darkness and other conditions of insufficient sunlight. Because the group of rechargeable batteries can provide enough instant power for the system by itself, the system can perform its mosquito killing function during the time of night or other insufficient sunlight conditions. This characteristic allows the system to be functional beyond the scope of daytime.

The following calculations show how the output power of the group of rechargeable batteries could be much higher than the power received from the group of solar cells and how the output power of the group of rechargeable batteries could last beyond daytime.

Define energy $T(n)$ as total energy and $power(t)$ as instant power that the group of rechargeable batteries receive from the group of solar cells in time duration $T(n)$ of electricity non-supply. Then, the following is obtained.

$$\text{energy } T(n) = \int_{T(n)} \text{power}(t)\, dt$$
$$= \text{average power}(T(n)) * T(n)$$

Here average $power(T(n))$ is the value of average power that the group of rechargeable batteries receives during $T(n)$.

Define energy $T(s)$ as total energy and $power(t)$ as instant power that the group of rechargeable batteries supply to the electronic circuit of the system in time duration $T(s)$ of electricity supply. Then, the following is obtained.

$$\text{energy } T(s) = \int_{T(s)} \text{power}(t)\, dt$$
$$= \text{average power}(T(s)) * T(s)$$

Here average $power(T(s))$ is the value of average power that the group of rechargeable batteries supplies during $T(s)$.

Assume output energy equal to input energy of the group of rechargeable batteries in one period. Then, the following is obtained.

energy $T(s)$=energy $T(n)$ Then, average power($T(s)$)*$T(s)$=average power($T(n)$)*$T(n)$ Then, average power($T(s)$)=average power($T(n)$)*$T(n)$/$T(s)$ If $T(n)>T(s)$, then, average power($T(s)$)>average power($T(n)$)

If $T(n)$ is significantly greater than $T(s)$, then the average output power is significantly greater than the average input power of the group of rechargeable batteries, even considering certain energy loss in the process of energy transformation in the group of rechargeable batteries. In general, the values of the input power and the output power can be considered as constants in one period. Then the average power is equal to instant power. Then, the instant power output is significantly greater than instant power input of the group of rechargeable batteries.

If power consumption of the electronic circuit of the system is less than the maximum of the instant power output of the group of rechargeable batteries, the excess energy of the group of rechargeable batteries is reserved in the group of rechargeable batteries. Thus, the power supply time of the group of rechargeable batteries can be beyond the scope of daytime.

When the group of solar cells is under sunlight, besides the group of rechargeable batteries, the group of solar cells also supplies electricity to the electronic circuit of the system in the state of electricity supply. This electricity supply from the group of solar cells results in more energy reservation in the group of rechargeable batteries and longer electricity supply time from the group of rechargeable batteries to the electronic circuit of the system beyond daytime.

The electronic switch is the process control component of the system. The electronic switch is made of integrated circuit. When the gate of the electronic switch is open, the direct current from the group of rechargeable batteries and the group of solar cells passes through the electronic switch and the system is in the state of electricity supply. When the gate of the electronic switch is close, the direct current from the group of rechargeable batteries and the group of solar cells cannot pass through the electronic switch and the system is in the state of electricity non-supply. The output from the electronic switch presents the control function of the electronic switch. The control process is shown by FIG. 6. FIG. 6 is the curve of the current intensity of the output of the electronic switch. The curve is a periodic function in mathematics. There are two values of the current intensity. The high value of the current intensity is a non-zero value, such as 200 milliampere when the gate of the electronic switch is open. The low value of the current intensity is zero when the gate of the electronic switch is close. The ratio of electricity non-supply time duration T(n) to electricity supply time duration T(s) is 7:1 in FIG. 6. The period of the curve is eight seconds. Using the ratio of 7:1, in eight hours, the system is in the state of electricity non-supply for seven hours and is in the state of electricity supply for one hour. Therefore, large percentage of the energy generated by the group of solar cells can be stored in the group of rechargeable batteries and the electricity supply to the system can last very long during sunlight insufficient conditions, such as night. Using period of eight seconds, the system can perform its mosquito electrocuting function seven to eight times per minute. This mosquito killing rate of seven to eight times per minute is suitable to most environmental conditions of residential areas.

The electronic oscillator is the component to generate necessary conditions for voltage step-up transformation. The electronic oscillator transforms direct current into oscillating current. The electronic oscillator comprises a transistor and a circuit of RLC (resistor R, inductor coil L, and capacitor C). It is important to notice that the electronic oscillator itself consumes significant amount of energy when it transforms direct current into oscillating current. Because the energy consumption for killing mosquitoes is very limited, the electronic oscillator itself consumes most of the energy that is generated by the group of solar cells. Therefore, it is an energy efficient process to supply electricity to the electronic oscillator in a non-continuous way and let the electricity supply time as short as possible in each period under the condition that the high voltage electric charge storage capacitor can frequently accumulate enough high voltage electric charge to kill mosquitoes.

The voltage step-up transformer is the component to generate high voltage. The voltage step-up transformer transforms low voltage input from the electronic oscillator, which is generally less than 3 volts, to a high voltage output to the capacitor, which is generally around 1000 volts.

The group of diodes is the component to realize one way movement of the high voltage electric charge. In the embodiment, the group of diodes has four diodes. The group of diodes controls the one way movement of the high voltage electric charge and therefore ensures the high voltage electric charge to be kept in the high voltage electric charge storage capacitor. The control of the one way movement of the electric charge is important. First, because the voltage output of the transformer is oscillating, the group of diodes makes the accumulation of electric charge be realized when the force to move the electric charge is oscillating. Second, because the transformer does no t provide force to hold the electric charge in the high voltage electric charge storage capacitor when the system is in the state of electricity non-supply, the group of diodes makes the electric charge accumulated in the high voltage electric charge storage capacitor stay in the capacitor until a mosquito touches the strings of the grid and then causes discharge of the high voltage electric charge through the body of the mosquito. The usage of four diodes, instead of one diode, is to make the maximum voltage that the electronic one way circuit could endure to be much higher than 1000 volts.

The high voltage electric charge storage capacitor is the second energy storage component of the system. The high voltage electric charge storage capacitor accumulates high voltage electric charge when the apparatus is in the state of electricity supply. The high voltage electric charge storage capacitor stores the high voltage electric charge when the apparatus is in the state of electricity non-supply. The high voltage electric charge storage capacitor discharges the high voltage electric charge through the electric grid and the mosquito body. The combination of the high voltage electric charge storage capacitor and the one way circuit of the four diodes makes the apparatus reach at and continuously keep in the functional state when the electric supply is discrete and the time duration of electricity supply is short.

The electric grid is the component to discharge high voltage electric charge through the body of the mosquito. The electric grid is connected with the high voltage electric charge storage capacitor. When a mosquito touches the strings of the electric grid, the high voltage electric charge is discharged through the strings and the body of the mosquito to electrocute the mosquito.

The embodiment of the structure and the control process of the energy efficient sunlight powered mosquito killing system presents the specifications and advantages of the system. It should be pointed out that the ratio of 7:1 of the time duration of electricity non-supply to the time duration of electricity supply is only one possible choice. Comprehensive consideration for the factors of cost of the electronic switch, capacity of the capacitor, power of the group of solar cells, and capacity of the group of rechargeable batteries would result in a specific optimized ratio for a specific system.

A kind of mosquito attraction and killing system can be created from combination of the sunlight and water utilized compound mosquito attraction apparatus and the energy efficient sunlight powered mosquito killing system that are discussed above. This kind of mosquito attraction and killing system performs its function of mosquito attraction and killing solely based on natural resources of sunlight and water, and can perform its function during both daytime and nighttime.

A preferred embodiment of the mosquito attraction and killing system is presented in the followings.

Figure 7:
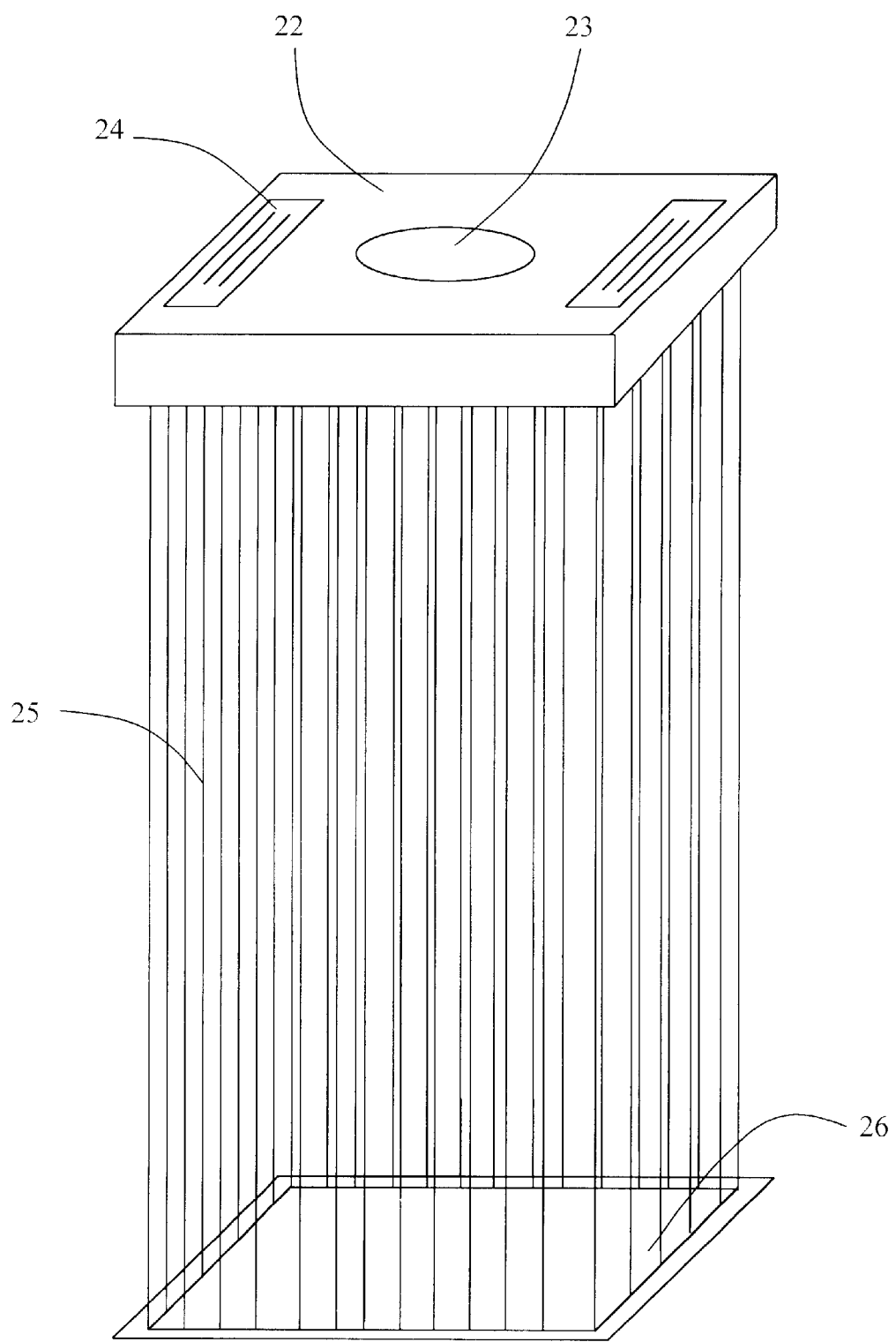
FIG. 7 shows a physical form of the mosquito attraction and killing system before the sunlight and water utilized compound mosquito attraction apparatus is inserted.
Figure 8:
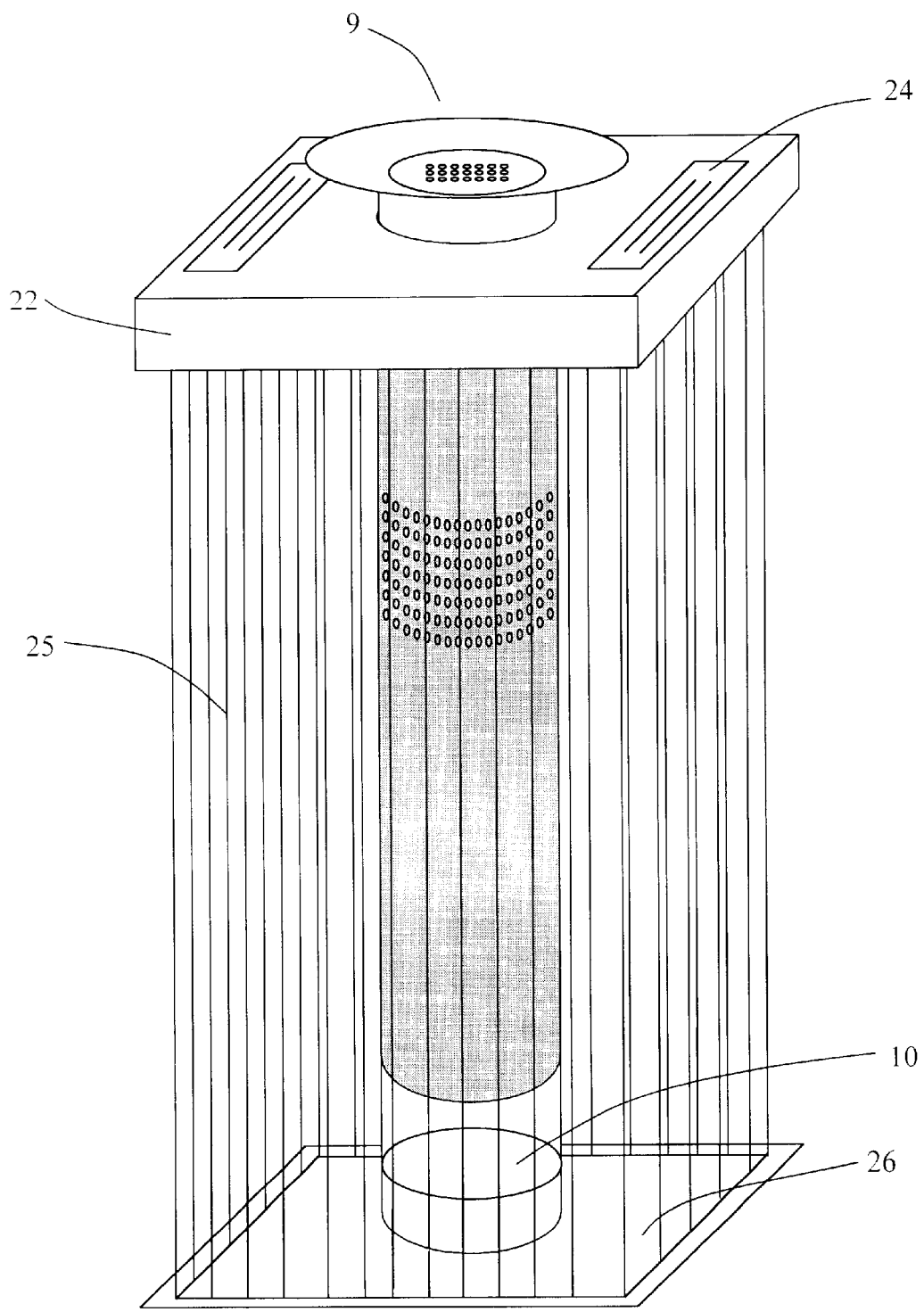
FIG. 8 shows a physical form of the mosquito attraction and killing system after the sunlight and water utilized compound mosquito attraction apparatus is inserted.

The physical form of the embodiment is shown by FIG. 7 and FIG. 8. The system structure and the system control process of the mosquito killing system applied in this embodiment are the same as the presented above. Because the group of solar cells and the electric grid of the mosquito killing system are important parts of the physical form of the mosquito attraction and killing system, their physical forms are shown in FIG. 7 and FIG. 8.

To clearly present the advantages of the physical form of the sunlight and water utilized compound mosquito attraction apparatus and the physical form of the whole system, the physical forms of the mosquito attraction and killing system are to be presented in two steps by the two figures of FIG. 7 and FIG. 8.

FIG. 7 presents the physical form of the mosquito attraction and killing system before the sunlight and water utilized compound mosquito attraction apparatus is inserted. FIG. 8 presents the physical form of the mosquito attraction and killing system after the sunlight and water utilized compound mosquito attraction apparatus is inserted.

First, FIG. 7 is described. There is a top box 22 on the top of the system. There is a hole 23 in the center of the top box. The shape and the size of the hole are the same as the cross section of the column of the sunlight and water utilized compound mosquito attraction apparatus. The hole has two functions. The first function is to let the column of the sunlight and water utilized compound mosquito attraction apparatus pass through the top box through the hole so that the column can be placed inside the mosquito attraction and killing system. The second function of the hole is to hold the upper part of the column of the sunlight and water utilized compound mosquito attraction apparatus to keep it stand inside the mosquito attraction and killing system. There is a group of solar cells 24 on the upper surface of the top box. The electronic circuit of the system is placed inside the top box. An electric grid 25 stands between the top box and the bottom 26 of the system and would surround the column of the sunlight and water utilized compound mosquito attraction apparatus if it is placed inside the system. A layer of net could be added to surround the electric grid for avoiding direct touch of the electric grid. There also could be a circular protrusion in the center of the bottom of the system to hold the column of the sunlight and water utilized compound mosquito attraction apparatus. However, for the emphasis of specifications of the invention, this protection layer of net surrounding the electric grid and the circular protrusion in the center of the bottom of the system are not shown in this figure.

Second, FIG. 8 is described. FIG. 8 is the combination of FIG. 4 of slightly reduced size and FIG. 7. The column of the sunlight and water utilized compound mosquito attraction apparatus 9 passes through the hole of the top box 22 and stands on the bottom 26 of the system. The upper part of the column of the sunlight and water utilized compound mosquito attraction apparatus is held by the wall of the hole of the top box. Inside the column, water is contained but is not shown in the figure. The standing water container also contains water. The upper surface 10 of the water inside the standing water container is shown in the figure to present the functional state of the system. The electric grid 25 surrounds the mosquito attraction apparatus. The group of solar cells 24 is on the upper surface of the top box. The electric circuit is inside the top box.

The mosquito attraction and killing system described by FIG. 7 and FIG. 8 solely uses natural resources of sunlight and water as its functional resources to perform the functions of mosquito attraction and mosquito killing. The sunlight and water utilized compound mosquito attraction apparatus performs the function of mosquito attraction by using natural resources of sunlight and water. The energy efficient sunlight powered mosquito killing system performs the function of mosquito killing by using natural resource of sunlight. Due to the specific characteristics of the sunlight and water utilized compound mosquito attraction apparatus and the energy efficient sunlight powered mosquito killing system, the mosquito attraction and killing system can perform its functions of mosquito attraction and mosquito killing during both daytime and nighttime.

Besides its advantages in functional resources and functional time length, the mosquito attraction and killing system presented in FIG. 7 and FIG. 8 also has the advantage in the aspect of physical form.

There is a top box that plays multiple roles in the system. There is a hole on the top box of the system. The hole on the top box matches the shape and size of the column of the sunlight and water utilized compound mosquito attraction apparatus. To make the system complete, it is only required that the column of the sunlight and water utilized compound mosquito attraction apparatus just passes through the hole and stands inside the system, and the wall of the hole on the top box keeps the column of the sunlight and water utilized compound mosquito attraction apparatus standing steadily. There is no any other specific part and any other specific step of process to let the column of the sunlight and water utilized compound mosquito attraction apparatus combine with other parts of the system.

This specific physical form of the system is important in usage and manufacture. During usage, the user of the system only needs to take out the column from the hole, add water into the column, and insert the column back into the hole. During manufacture, the manufacturer of the system does not need to assemble the column of the sunlight and water utilized compound mosquito attraction apparatus with other parts of the system and does not need to add water into the system. It is emphasized that the operation of the system needs water to be inside the column of the sunlight and water utilized compound mosquito attraction apparatus. If the physical form of the system requires the manufacturer to add water into and to keep water in the apparatus, many difficulties in processes of manufacture, transportation, and storage will be generated due to the existence of water. If the user of the system is required to add water into a mosquito attraction and killing system with a complicated procedure due to the complicated physical form, the complication to add water will discourage the usage of the system. Therefore, the physical form of the system presented above shows a significant advantage in the aspect of convenience for the usage and manufacture.

What is claimed is:

1. A mosquito attraction and killing system comprising a sunlight and water utilized compound mosquito attraction apparatus and an energy efficient sunlight powered mosquito killing system;
   (a) said sunlight and water utilized compound mosquito attraction apparatus comprising:
      (i) a multi-function solar utilizer which is capable of containing liquid, and further comprising a number of small holes located on an upper part of said multi-function solar utilizer to let substances pass through from an inside of said multi-function solar utilizer to an outside of said multi-function solar utilizer, a color of an outer surface of said multi-function solar utilizer being a dark color, and water being contained inside said multi-function solar utilizer during operation of said multi-function solar utilizer; and
      (ii) a standing water container being capable of containing a liquid, and further comprising a wall of said standing water container being transparent, and water being contained inside said standing water container with an upper surface of said water being visible from an outside of said standing water container during operation of said standing water container;
   (b) said energy efficient sunlight powered mosquito killing system comprising an electronic circuit with eight major components and operating by a periodic control process:
      (i) a group of solar cells for transforming sunlight to electricity of direct current;

(ii) a group of rechargeable batteries for storing the energy of said electricity from said group of solar cells and for releasing electricity of direct current to said electronic circuit of said energy efficient sunlight powered mosquito killing system;

(iii) an electronic switch for executing the periodic control process which allows said energy efficient sunlight powered mosquito killing system to be alternatively in either a state of electricity supply for a certain time duration or a state of electricity non-supply for a certain time duration, the states occurring in a periodic pattern;

(iv) an electronic oscillator for transforming the direct current from said group of rechargeable batteries and said group of solar cells into an oscillating current;

(v) a voltage step-up transformer for transforming a low voltage input of the oscillating current into a high voltage output;

(vi) a high voltage electric charge storage device for accumulating high voltage electric charge during the state of electricity supply and for keeping accumulated high voltage electric charge during the state of electricity non-supply;

(vii) means for causing the high voltage electric charge to move in one direction in said electronic circuit so as to ensure that the high voltage electric charge is kept in said high voltage electric charge storage device;

(viii) a metal grid for discharging the high voltage electric charge through bodies of mosquitoes which is connected with said high voltage electric charge storage device;

wherein during operation of said energy efficient sunlight powered mosquito killing system by the periodic control process, the flow of electric current from said group of rechargeable batteries and said group of solar cells to said electronic oscillator and said voltage step-up transformer is allowed for the certain time duration when said electronic switch is in an open state, and the flow of electric current from said group of rechargeable batteries and said group of solar cells to said electronic oscillator and said voltage step-up transformer is blocked for the certain time duration when said electronic switch is in a closed state.

2. The mosquito attraction and killing system of claim 1, wherein said sunlight and water utilized compound mosquito attraction apparatus further comprising a column with said multi-function solar utilizer being an upper part of said column and said standing water container being a lower part of said column.

3. The mosquito attraction and killing system of claim 1, wherein said sunlight and water utilized compound mosquito attraction apparatus further comprising a column having a circular cross section with said multi-function solar utilizer being an upper part of said column and said standing water container being a lower part of said column.

4. The mosquito attraction and killing system of claim 1, wherein said sunlight and water utilized compound mosquito attraction apparatus further comprising a column with said multi-function solar utilizer being an upper part of said column and said standing water container being a lower part of said column, and a number of open small holes on a top of said multi-function solar utilizer for collecting rain water.

5. The mosquito attraction and killing system of claim 1, wherein said sunlight and water utilized compound mosquito attraction apparatus further comprising a column with said multi-function solar utilizer being an upper part of said column and said standing water container being a lower part of said column, and both a number of open small holes and a broad brim on a top of said multi-function solar utilizer for collecting rain water.

6. The mosquito attraction and killing system of claim 1, wherein said certain time duration of said state of electricity non-supply is greater than said certain time duration of said state of electricity supply and the summation of said certain time duration of said state of electricity non-supply and said certain time duration of said state of electricity supply is less than one minute.

7. The mosquito attraction and killing system of claim 1, wherein a) said sunlight and water utilized compound mosquito attraction apparatus further comprising a column;

b) said mosquito attraction and killing apparatus further comprising a top box with an open hole having the same shape and size as the shape and cross-sectional size of said column of said sunlight and water utilized compound mosquito attraction apparatus;

c) said group of solar cells being located on an upper surface of said top box, d) at least a portion of said electronic circuit of said energy efficient sunlight powered mosquito killing system being located inside of said top box; and wherein when the sunlight and water utilized compound mosquito attraction apparatus is integrated with the rest of the mosquito attraction and killing system, said column of said sunlight and water utilized compound mosquito attraction apparatus is inserted into and through said open hole of said top box and said column of said sunlight and water utilized compound mosquito attraction apparatus is allowed to stand on a bottom of said mosquito attraction and killing apparatus.

* * * * *